(12) United States Patent
Goda

(10) Patent No.: US 11,307,633 B2
(45) Date of Patent: Apr. 19, 2022

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Keigo Goda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/864,878

(22) Filed: Jan. 8, 2018

(65) Prior Publication Data

US 2018/0129264 A1    May 10, 2018

Related U.S. Application Data

(63) Continuation of application No. 13/863,692, filed on Apr. 16, 2013, now Pat. No. 9,898,064.

(30) Foreign Application Priority Data

Apr. 18, 2012 (JP) .................. 2012-094819

(51) Int. Cl.
  *G06F 1/32*    (2019.01)
  *G03G 15/00*   (2006.01)
  *G06F 1/3234*  (2019.01)

(52) U.S. Cl.
  CPC ....... *G06F 1/3234* (2013.01); *G03G 15/5004* (2013.01); *G03G 15/5016* (2013.01); *G06F 1/3275* (2013.01); *Y02D 10/00* (2018.01); *Y02D 30/50* (2020.08)

(58) Field of Classification Search
  None
  See application file for complete search history.

(56) References Cited

U.S. PATENT DOCUMENTS

| 8,612,784 B2* | 12/2013 | Kim ...................... G06F 1/3228 713/320 |
| 2004/0012812 A1* | 1/2004 | Shimizu ............. H04N 1/00856 358/1.15 |
| 2007/0260358 A1* | 11/2007 | Katoh .................... B41J 29/393 700/286 |
| 2009/0204840 A1* | 8/2009 | Sakamoto ............... G06F 21/10 713/340 |
| 2010/0312946 A1* | 12/2010 | Bold ................... G06F 11/0766 711/102 |

(Continued)

FOREIGN PATENT DOCUMENTS

| CN | 1893529 A | 1/2007 |
| CN | 101465929 A | 6/2009 |

(Continued)

*Primary Examiner* — Jaweed A Abbaszadeh
*Assistant Examiner* — Cheri L Harrington
(74) *Attorney, Agent, or Firm* — Canon U.S.A., Inc. IP Division

(57) ABSTRACT

An information processing apparatus including a volatile storage unit, and is operated in any of a plurality of modes including a first power mode and a second power mode, power being supplied to the storage unit in the first power mode and the second power mode, power consumption in the first power mode being higher than power consumption in the second power mode.

18 Claims, 11 Drawing Sheets

(56) References Cited

U.S. PATENT DOCUMENTS

| | | | |
|---|---|---|---|
| 2011/0018854 A1* | 1/2011 | Barclay | G06F 1/3203 345/211 |
| 2011/0055538 A1* | 3/2011 | Cho | G06F 9/4418 713/2 |
| 2011/0131007 A1* | 6/2011 | Huang | G03F 7/70633 702/150 |
| 2011/0141007 A1* | 6/2011 | Yamamizu | G03G 15/5004 345/156 |
| 2011/0199628 A1* | 8/2011 | Tohki | H04N 1/0035 358/1.13 |
| 2011/0235107 A1* | 9/2011 | Sakata | H04N 1/00416 358/1.15 |
| 2011/0243594 A1 | 10/2011 | Saito | |
| 2011/0320925 A1* | 12/2011 | Piersol | G06Q 10/06 715/231 |
| 2012/0042359 A1* | 2/2012 | Kuroda | G06F 21/31 726/3 |
| 2012/0104692 A1* | 5/2012 | Tabuchi | B65H 7/04 271/265.04 |
| 2012/0144177 A1* | 6/2012 | Iyigun | G06F 8/65 713/2 |
| 2012/0236353 A1* | 9/2012 | Nagayama | G03G 15/5004 358/1.13 |
| 2013/0088735 A1* | 4/2013 | Cho | H04N 1/00411 358/1.13 |
| 2013/0156457 A1* | 6/2013 | Tsukahara | H04N 1/00896 399/75 |
| 2013/0275786 A1* | 10/2013 | Tanaka | G06F 1/3234 713/320 |

FOREIGN PATENT DOCUMENTS

| | | |
|---|---|---|
| CN | 102096575 A | 6/2011 |
| EP | 2333613 A2 | 6/2011 |
| JP | 9-034578 A | 2/1997 |
| JP | 2000-082014 A | 3/2000 |
| JP | 2011124876 A | 6/2011 |

* cited by examiner

POWER ON STATE

POWER OFF STATE

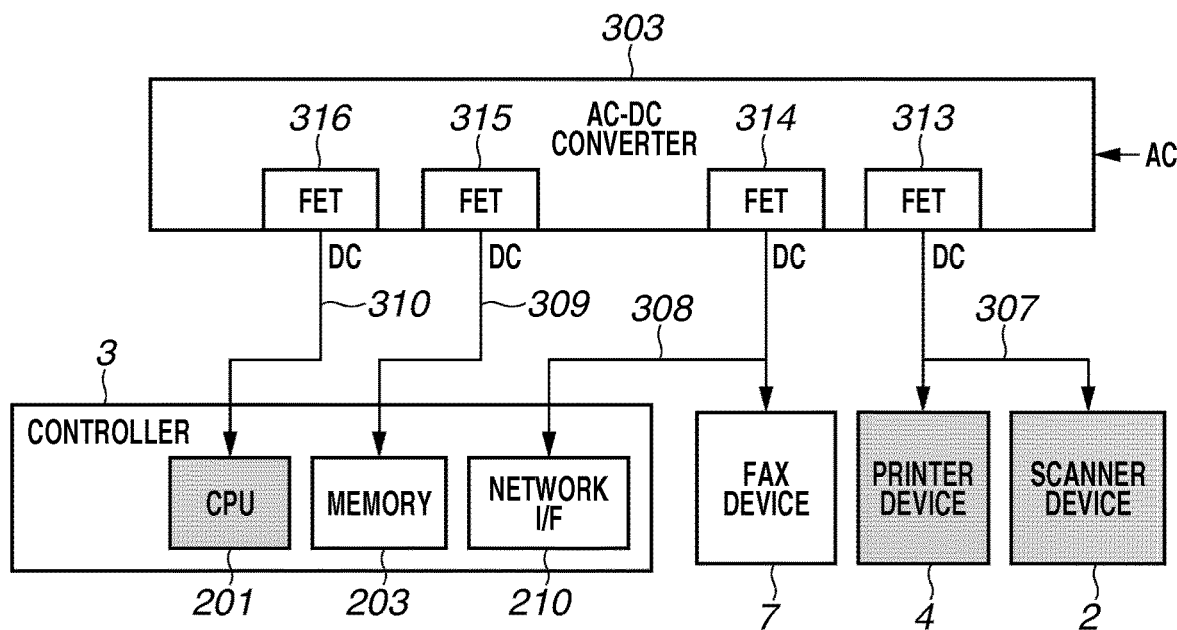
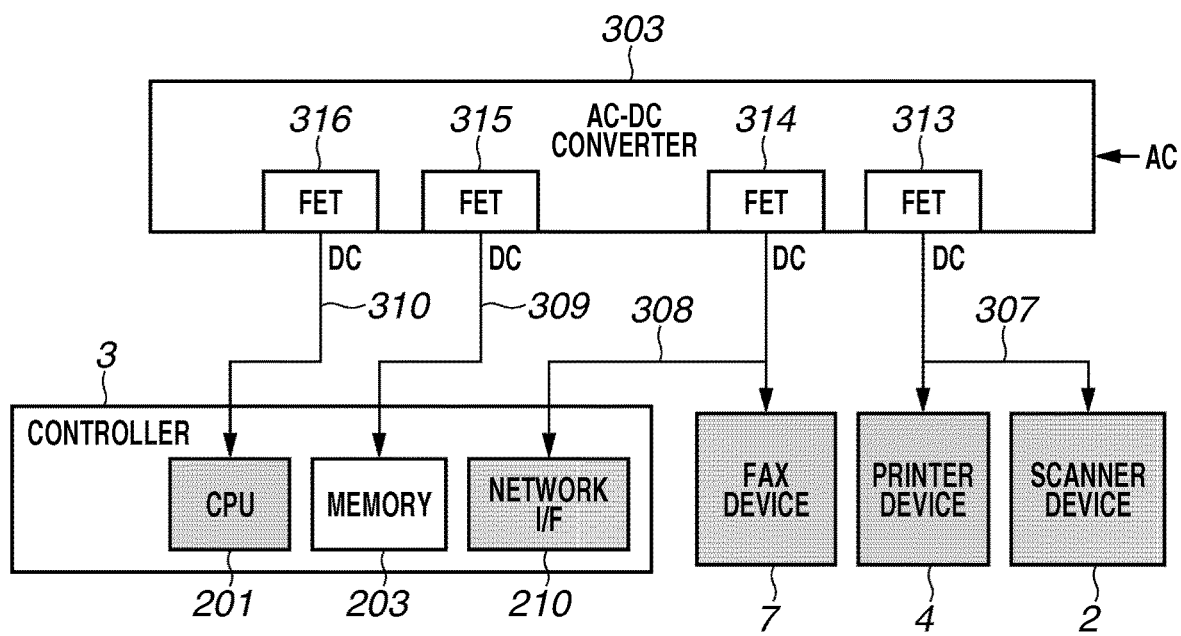

INFORMATION PROCESSING APPARATUS, CONTROL METHOD THEREOF, AND STORAGE MEDIUM

CROSS-REFERENCE TO RELATED APPLICATION

This application is a Continuation of U.S. application Ser. No. 13/863,692, filed Apr. 16, 2013, which claims priority from Japanese Patent Application No. 2012-094819 filed Apr. 18, 2012, which are hereby incorporated by reference herein in their entireties.

BACKGROUND OF THE INVENTION

Field of the Invention

The present invention relates to an information processing apparatus, a control method thereof, and a storage medium.

Description of the Related Art

In recent years, an information processing apparatus tends to take a longer time to be activated. One of its causes is that, along with increasing functions provided with the information processing apparatus, an amount of data to be loaded from a read only memory (ROM) to a random access memory (RAM) when the information processing apparatus is activated has been increased.

To address this problem, a technique has been developed in which, when a user turns off a power switch, the data in the RAM is retained as it is and thus, when the user turns on the power next time, the data does not have to be loaded from the ROM to the RAM, thereby reducing the time required for activation. As such a technique, Japanese Patent Application Laid-Open No. 9-34578 discusses a technique referred to as "suspend" for retaining the data in the RAM by continuing energizing the RAM.

Further, as such a technique, Japanese Patent Application Laid-Open No. 2000-82014 discusses a technique referred to as "hibernation" for retaining the data in the RAM by temporarily saving the data in the RAM into a hard disk (HDD). By such techniques described above, the power of the apparatus seems to be completely turned off from the user, however, the time required for activation can be reduced.

Generally, the information processing apparatus includes a display unit capable of displaying a setting screen via which the user sets an operation of the information processing apparatus and a service mode screen via which a service person performs fine adjustment of the operations. Such screens are set to a display state by the user's operation, and until the user's operation is completely ended, the screens are kept displayed on the display unit.

To such an information processing apparatus, if the above-described technique for reducing the time required for the activation is applied, a problem described below will arise. Specifically, when the user turns off the power switch with the setting screen and the service mode screen displayed, and when the user turns on the power switch next time, the setting screen and the service mode screen are kept displayed. That is because the above-described technique for reducing the time required for the activation retains the data in the RAM as it is, and thus the screen displayed on the display unit is also maintained as it is.

For example, when the user leaves a computer after he turns off the power switch and then, when another user turns on the power switch, the screen set by the previous user is kept displayed, which is not preferable. Particularly, if a user having little knowledge operates the service mode screen, an erroneous adjustment value may be set for the information processing apparatus. Thus, it is desirable that the service mode screen is not displayed again considering security.

SUMMARY OF THE INVENTION

The present invention is directed to an information processing apparatus and a control method thereof capable of displaying an appropriate screen when the information processing apparatus is activated, while reducing a time required for activating the information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A-4D illustrate different power supply states of the image forming apparatus according to an exemplary embodiment of the present invention.

DESCRIPTION OF THE EMBODIMENTS

Various exemplary embodiments, features, and aspects of the invention will be described in detail below with reference to the drawings.

As an example of information processing apparatuses, an image forming apparatus will be described below, however, other apparatuses such as a personal computer (PC) may be used as the information processing apparatus.

<Configuration of Apparatus>

Figure 1:
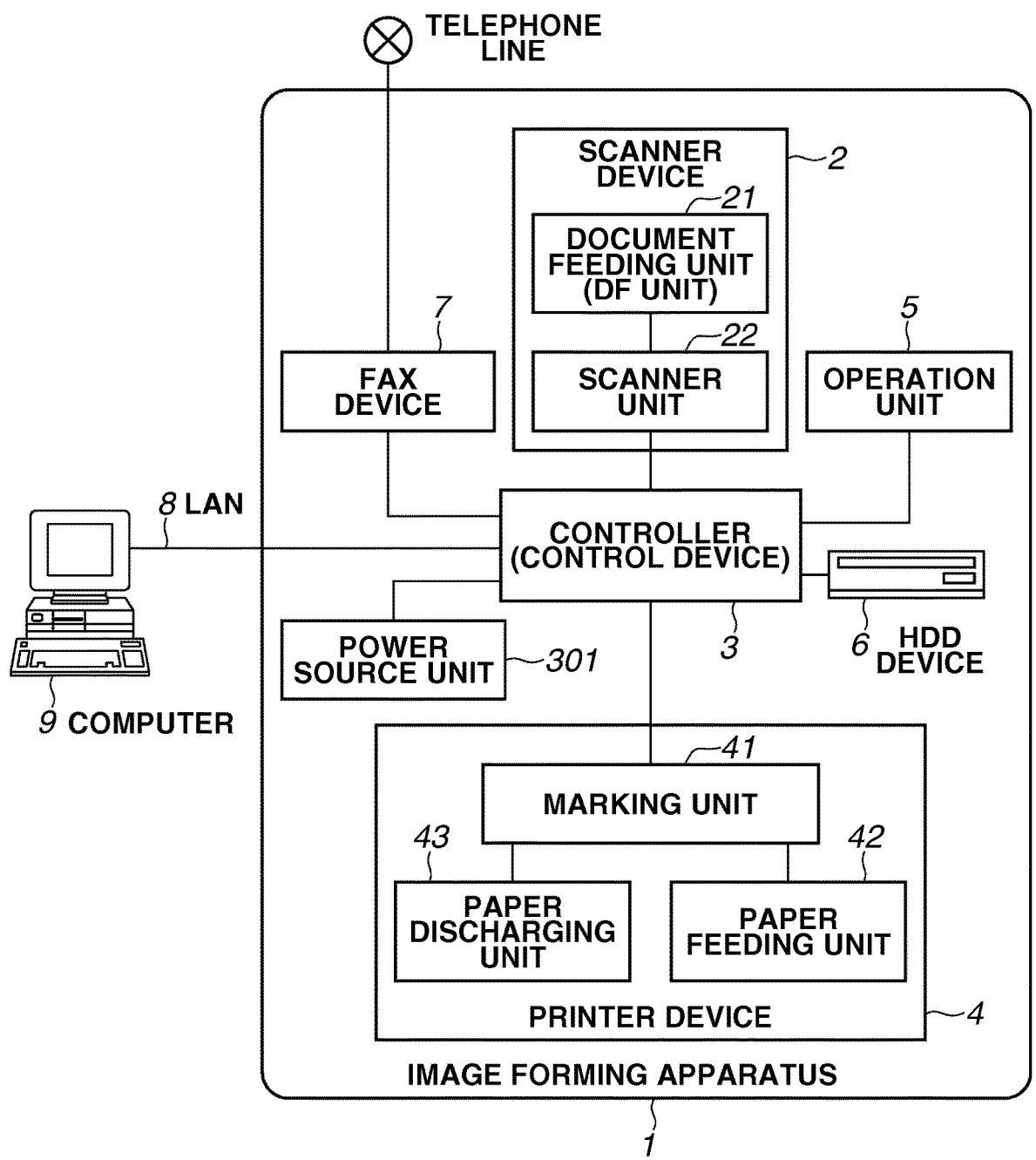
FIG. 1 is a block diagram illustrating a configuration of an image forming apparatus according to an exemplary embodiment of the present invention.

First, the configuration of the apparatus according to the present exemplary embodiment will be described with reference to FIGS. 1 to 4. FIG. 1 is a block diagram illustrating a configuration of the image forming apparatus according to the present exemplary embodiment.

An image forming apparatus 1 includes following components. A scanner device 2 optically reads an image from a document, converts the image into a digital image, and then transmits the digital image to a controller 3. A document feeding unit (DF) 21 sequentially, automatically supplies a bundle of documents. A scanner unit 22 optically scans the document and converts it into the digital image.

The controller 3 gives an instruction to each module to integrally control the image forming apparatus 1.

A printer device 4 outputs the digital image onto a sheet of paper. A marking unit 41 prints the image data onto a fed sheet of paper. A paper feeding unit 42 sequentially feeds a sheet of paper from the bundle of paper. A paper discharging unit 43 discharges the printed sheet of paper.

An operation unit 5 is used to operate the apparatus. The operation unit 5 includes an operation button via which a user gives an instruction for an operation of coping images to the image forming apparatus 1, and a display panel such as a liquid crystal screen as a display unit for providing various types of information about the image forming apparatus 1 to the user.

A hard disk device 6 stores digital images and control programs. A facsimile (FAX) device 7 transmits digital images to a telephone line.

A local area network (LAN) 8 connects the image forming apparatus 1 with a computer 9. The computer 9 inputs/outputs digital images to/from the image forming apparatus 1 via the LAN 8, issues jobs, and gives instructions to a device.

A power source unit 301 is connected to an alternating current (AC) power source so as to supply power to each component of the image forming apparatus 1.

Figure 2:
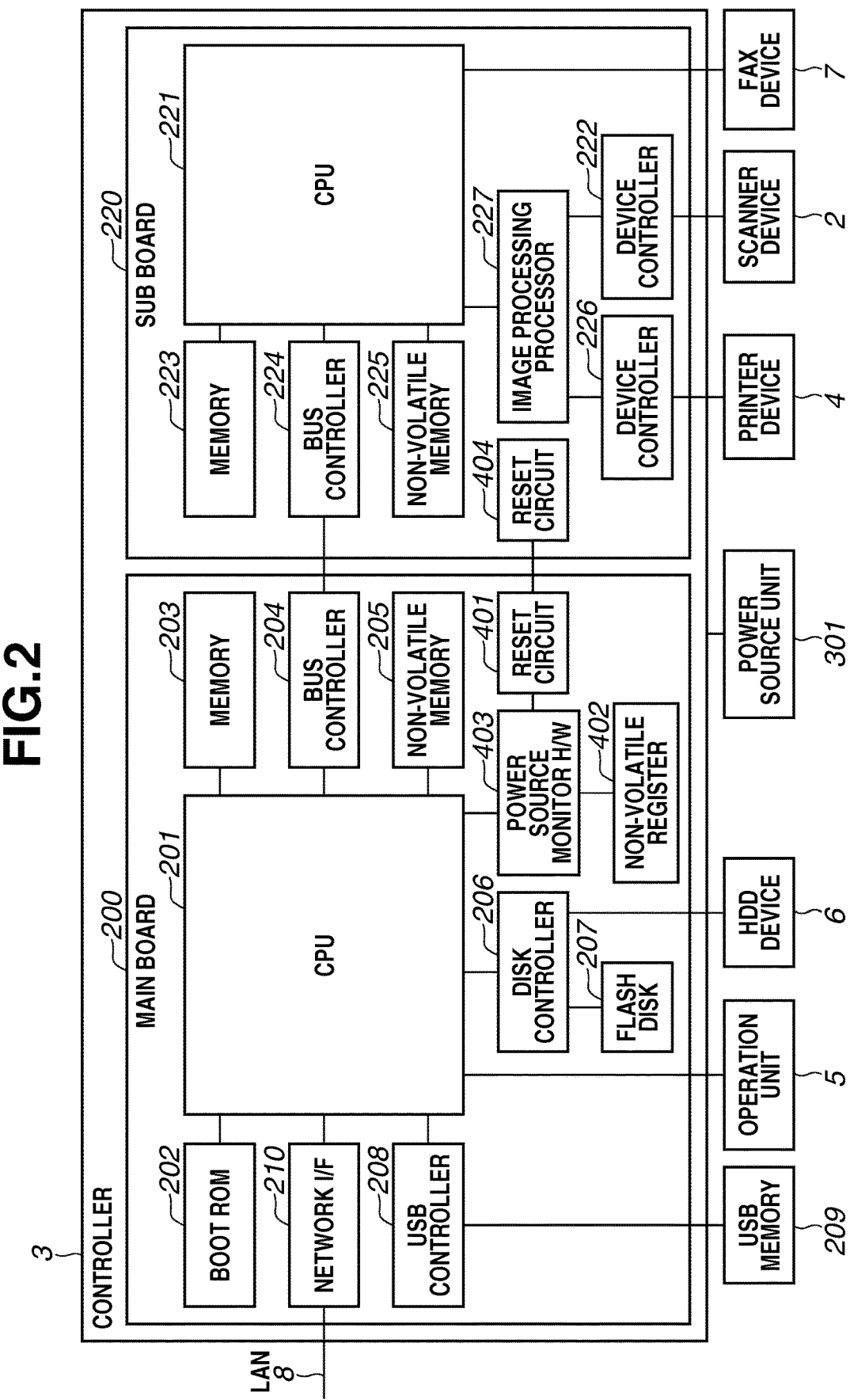
FIG. 2 is a block diagram illustrating a configuration of a controller of the image forming apparatus according to an exemplary embodiment of the present invention.

FIG. 2 is a block diagram illustrating a configuration of a controller of the image forming apparatus according to the present exemplary embodiment. Central processing units (CPUs) 201 and 221 include a number of CPU peripheral hardware including chip sets, bus bridges, and clock generators, however, in FIG. 2, they are omitted.

The controller 3 includes a main board 200 and a sub board 220. The main board 200 is a general CPU system and includes the following components.

The CPU 201 controls the entire main board 200. A boot ROM 202 stores an initial program referred to as a basic input/output system (BIOS).

A memory 203 is used as a main storage memory of the CPU 201. A bus controller 204 has a function as a bridge with a bus controller 224 on a sub board 220. A non-volatile memory 205 retains information even when the power is shut down.

A disk controller 206 controls a hard disk device 6 and a storage device such as a flash disk 207.

A flash disk 207 is the storage device having a comparatively small capacity formed of a semiconductor such as a solid state drive (SSD). The flash disk 207 stores programs such as an operating system and a firmware executed by the CPU 201.

A universal serial bus (USB) controller 208 controls an input/output of data to/from a USB memory 209. The USB memory 209 stores various types of data to be used by the image forming apparatus 1.

A network I/F 210 inputs/outputs the data to/from the computer 9 via the LAN 8. The sub board 220 includes the comparatively small, general CPU system and an image processing hardware, and includes the following components.

The CPU 221 controls the entire sub board 220. A device controller 222 controls the input/output of the data to/from the scanner device 2.

A memory 223 is used as a main storage memory of the CPU 221. A bus controller 224 has a function as a bridge with the bus controller 204 on the main board 200. A non-volatile memory 225 retains the information even when the power is shut down.

A device controller 226 controls the input/output of the data to/from the printer device 4. An image processing processor 227 performs real-time digital image processing. In addition to the components described above, the controller 3 includes a power monitor unit described below.

A reset circuit 401 resets setting of hardware (H/W) on the main board 200. A state of a non-volatile register 402 cannot be reset by H/W reset. Further, the non-volatile register 402 can read/write the data from/to the CPU 201 via a power source monitor H/W 403.

The power source monitor H/W 403 monitors power control of the system. When the CPU 201 can normally perform the operation, according to an instruction of the CPU 201, the image forming apparatus 1 can be reset. Further, when power is not supplied to the CPU 201, with an input from a switch 302, a power-source remote signal 306 can be controlled to turn on the power of the controller 3. When an application specific integrated circuit (ASIC) is used, a small CPU system may be used. A reset circuit 404 resets the setting of the H/W on the sub board 220.

Figure 3:
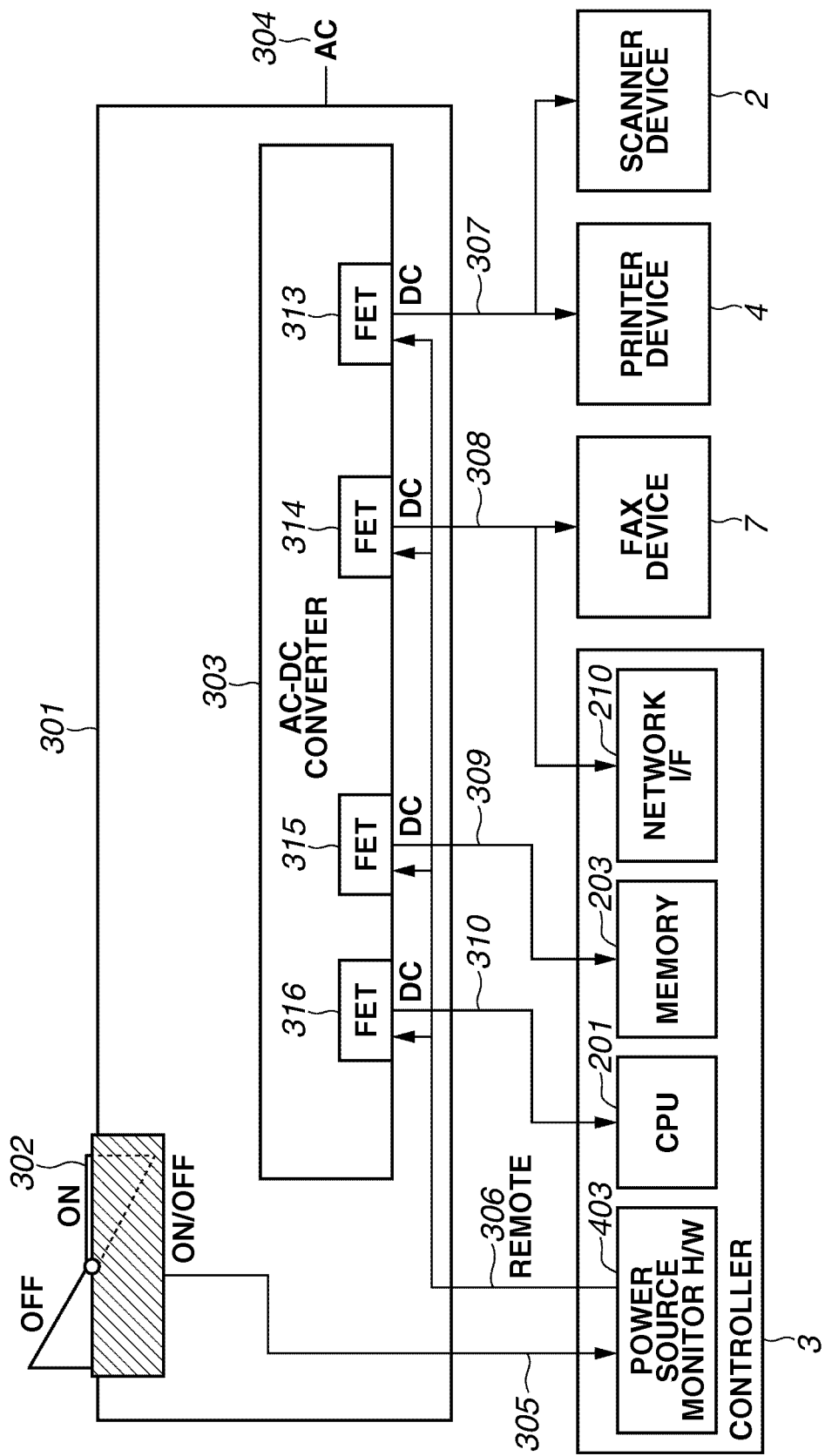
FIG. 3 is a block diagram illustrating a configuration of a power source unit of the image forming apparatus according to an exemplary embodiment of the present invention.

FIG. 3 is a block diagram illustrating a configuration of a power source unit of the image forming apparatus according to the present exemplary embodiment.

The power source unit 301 includes the following components. The switch 302 performs reception processing for receiving an operation for turning on or off the power of the image forming apparatus 1 from the user.

Further, the switch 302 keeps holding either of on and off states mechanically. In other words, the user inputs an on/off state by pushing the switch 302 down to either one of on and off sides. When the switch 302 is on, it is connected to an AC-DC converter to control the power.

On the other hand, when the switch 302 is off, the power supply is not stopped until the controller 3 completely shuts down the system. In other words, after a state of the switch 302 is notified via a power source cable 307 and the system is completely shut down, all DC power supply is turned off using a power remote signal.

According to the present exemplary embodiment, a toggle-type switch is used, however, a number of PCs employ a push-type switch. There are control patterns for the push-type switch, for example, of (1) functioning as "off" when the power of the apparatus is turned on, and (2) functioning as "on" when the power of the apparatus is not turned on.

Further, there is another control pattern, for example, of (3) inputting "forced off" by keeping pushing the switch longer than a predetermined time. The present exemplary embodiment does not limit the switch to the toggle-type switch. When the push-type switch is used, the on/off pattern described (1) and (2) may be applied to the on/off state of the toggle switch.

An AC-DC converter 303 converts AC power into DC power. An AC power input unit 304 inputs the AC power from an AC power source.

A line 305 is used to notify the controller 3 of the on/off state of the switch 302. This state is input into the power source monitor H/W 403.

A power-source remote signal 306 is used to control the AC-DC converter 303 according to the state of the switch 302. This signal is output via the power source monitor H/W 403.

A power source cable 307 supplies the DC power to the scanner device 2 and the printer device 4. A power source cable 308 supplies power to the network I/F 210 of the controller 3 and the FAX device 7.

A power source cable 309 supplies power to the memory 203 of the controller 3. A power source cable 310 supplies power to other components such as the CPU 201 of the controller 3. Other components include the operation unit 5 and the sub board 220.

Field effect transistors (FETs) 313 to 316 are each controlled by the power-source remote signal 306 so as to turn on/off the power supply to the power source cables 307 to 310.

Figure 4A:
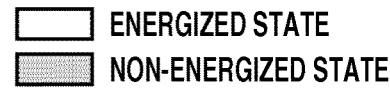
Figure 4A:
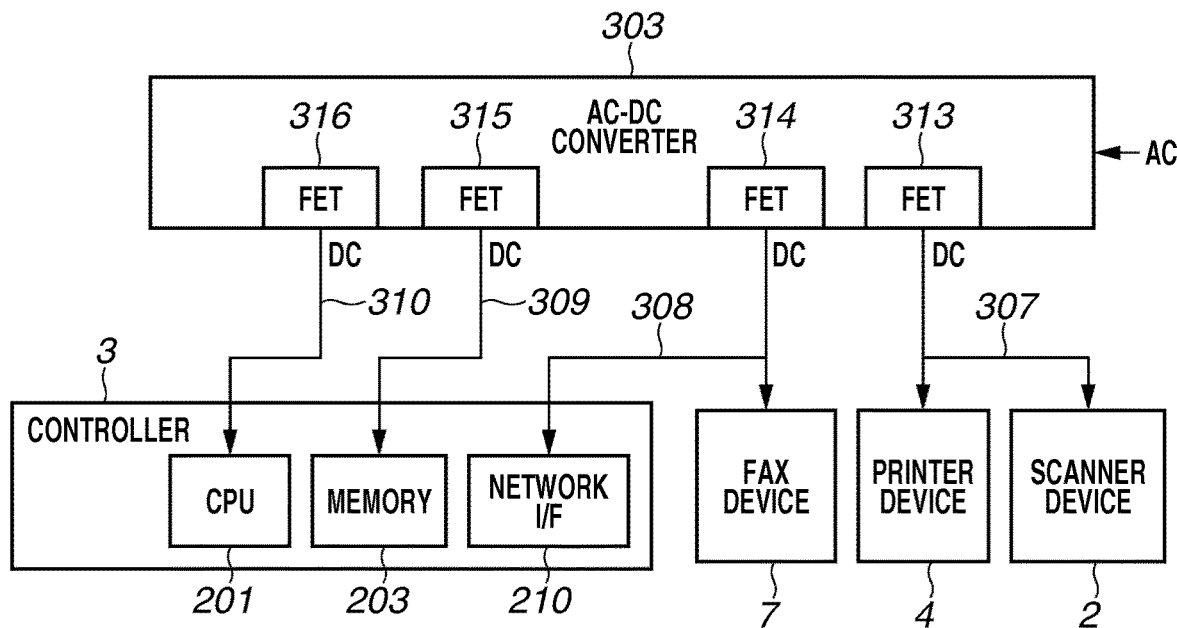

FIG. 4 illustrates a power supply state (power mode) of the image forming apparatus according to the present exemplary embodiment. In the description below, a state of "stop of power supply" includes a case where the power supply is "0" and also a case where a very small amount of power not enough for normally operating the power-supplied device is supplied FIG. 4A illustrates a power-on state. The power-on state herein is an example of a first power mode. In the power-on state, the switch 302 is on, and thus power is supplied to each component of the image forming apparatus 1. In the power-on state, if a predetermined time has elapsed with no function performed, the state shifts to a sleep state illustrated in FIG. 4C.

Figure 4B:
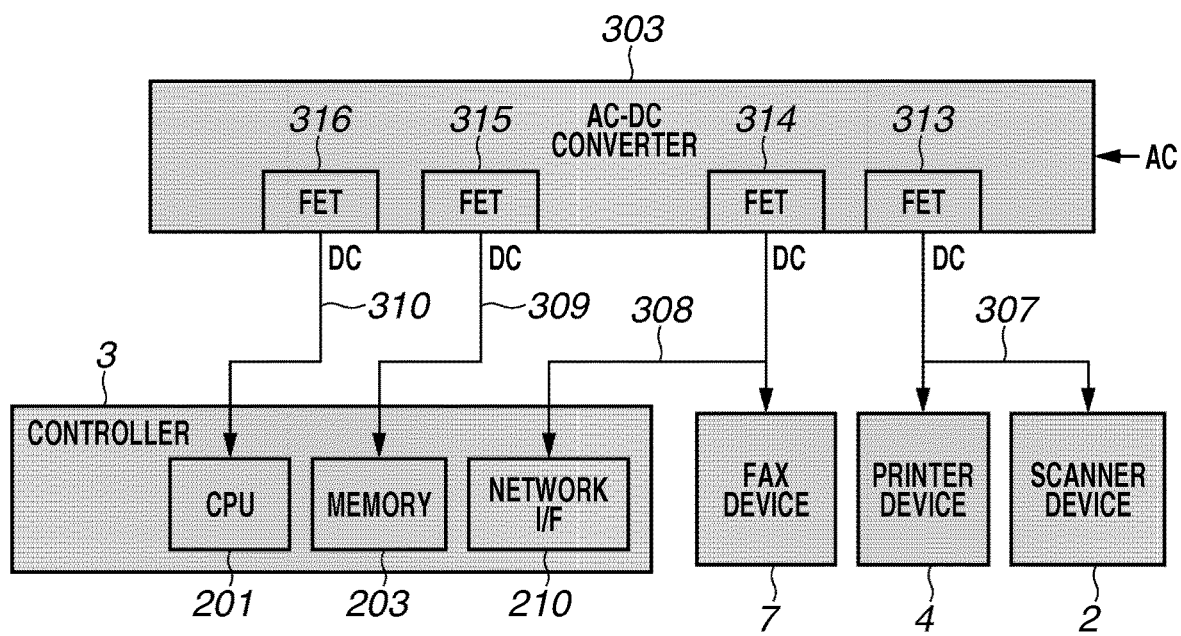

Further, in the power-on state, when the switch 302 is turned off, the state shifts to a power-off state illustrated in FIG. 4B under a predetermined condition. Furthermore, in the power-on state, when the switch 302 is turned off, the state shifts to a quick-off state illustrated in FIG. 4D under a predetermined condition.

FIG. 4B illustrates the power-off state. The power-off state herein is an example of a second power mode. In the second power mode, the switch 302 is off. Thus, in the power-off state, the power supply to each component of the image forming apparatus 1 is stopped. In the power-off state, when the switch 302 is turned on, the state shifts to the power-on state illustrated in FIG. 4A.

At this time, since a program of the boot ROM 202 is loaded into the memory 203, it takes a longer time to complete the activation, compared with the activation from the quick-off state illustrated in FIG. 4D.

FIG. 4C illustrates the sleep state. The sleep state herein is an example of the first power mode. In the first power mode, the switch 302 is on. Thus, in the sleep state, the power supply to the memory 203, the network I/F 210, the FAX device 7, and the AC-DC converter 303 is maintained, and the power supply to other components is stopped.

In the sleep state, when data is input to the network I/F 210 and the FAX device 7 or the user presses a sleep cancel switch of the operation unit 5, the state shifts to the power-on state illustrated in FIG. 4A. Further, in the sleep state, when the switch 302 is turned off, the state shifts to the power-off state illustrated in FIG. 4B under a predetermined condition.

Furthermore, in the sleep state, when the switch 302 is turned off, the state shifts to the quick-off state illustrated in FIG. 4D under a predetermined condition.

FIG. 4D illustrates the quick-off state. The quick-off state herein is an example of the second power mode. In the quick-off state, the switch 302 is off, and thus the power supply to the memory 203 and the AC-DC converter 303 is maintained and the power supply to other components is stopped. In the quick-off state, when the switch 302 is turned on, the state shifts to the power-on state illustrated in FIG. 4A. At this point, since the program that has been already loaded into the memory 203 is used, it takes a shorter time to complete the activation, compared with the activation from the power-off state illustrated in FIG. 4B. The power consumption in such a state is larger than that in the power-off state illustrated in FIG. 4B, and smaller than that in the sleep state illustrated in FIG. 4C.

The modes illustrated in FIGS. 4A to 4D are ranked in order of decreasing power consumption as below.
FIG. 4A>FIG. 4C>FIG. 4D>FIG. 4B
Further, the modes illustrated in FIGS. 4B to 4D are ranked in order of increasing time for shifting to FIG. 4A as below.
FIG. 4C>FIG. 4D>FIG. 4B <Function of Apparatus>

Next, functions of the apparatus according to the present exemplar embodiment will be described. The image forming apparatus 1 has the basic functions described below.

Copy

An image read by the scanner device 2 is recorded in the hard disk device 6, and printed using the printer device 4 at the same time.

Send (Image Transmission)

The image read by the scanner device 2 is transmitted to the computer 9 via the LAN 8.

Box (Image Storage)

The image read by the scanner device 2 is recorded in the hard disk device 6, and the image transmission and the image printing are performed as necessary.

Print (Image Printing)

A page description language, for example, transmitted from the computer 9 is analyzed and then printed by the printer device 4.

An operation for copying the image by the image forming apparatus 1 will be briefly described below. When the user gives an instruction for copying the image via the operation unit 5, the CPU 201 transmits an instruction for reading the image to the scanner device 2 via the CPU 221.

The scanner device 2 optically scans a document, converts the scanned data into digital image data, and then inputs the digital image data into the image processing processor 227 via the device controller 226. The image processing processor 227 transfers the digital image data to the memory 223 via the CPU 221 by direct memory access (DMA), and then temporarily stores the digital image data in the memory 223.

When the CPU 201 confirms that a certain amount of or all digital image data is input into the memory 223, it gives an instruction for outputting the image to the printer device 4 via the CPU 221. The CPU 221 notifies the image processing processor 227 of a location of the image data in the memory 223, and then transmits the image data in the memory 223 to the printer device 4 via the image processing processor 227 and the device controller 226 according to a synchronization signal from the printer device 4.

With the processing described above, the printer device 4 prints the digital image data onto a paper device. When a plurality of copies is printed, the CPU 201 stores the image data stored in the memory 223 into the hard disk device 6, and thus for the copies subsequent to the second one, the image can be transmitted to the printer device 4 without receiving one from the scanner device 2. If a complete deletion function described below is activated, the image data stored in the hard disk device 6 can be deleted by a method for making the image to be hardly recovered after the printing is finished.

Further, the image forming apparatus 1 has additional functions as described below.

High-Speed Activation Function

The high-speed activation function keeps content of a main storage memory in the operation of turning off the power by keeping a state of energizing the main storage memory of the controller 3 so that the user can operate the image forming apparatus 1 in a short time when turning on the power next time.

Login Function

The login function receives an input of a user identification (ID) and a password corresponding to the user via the operation unit 5 and also receives an input of various types of jobs only when individual authentication is successfully performed. History of the user and performed jobs is recorded to improve security.

Complete Deletion Function

The complete deletion function performs overwriting with random data in a region where the image is recorded in the hard disk device 6 when the image recorded in the hard disk device 6 is deleted. The image can be hardly recovered to improve the security.

Auto-Clear Function

The auto-clear function returns the screen displayed on the display panel of the operation unit 5 to a normal screen when the user does not perform the operation or the job for a predetermined time or longer. A default value may be used as the predetermined time, or the predetermined time may be set by the user.

Sleep Function

The sleep function shifts the image forming apparatus 1 to the sleep state to reduce the power consumption thereof when the job has not been performed for a predetermined time or longer. A default value may be used as the predetermined time, or the predetermined time may be set by the user. The predetermined time for shifting to the sleep state is set to be longer than the predetermined time for performing the auto-clear function.

The image forming apparatus 1 can change whether the additional functions described above are activated depending on each setting. The display panel of the operation unit 5 is formed to display various types of setting screens, and thus the user can select whether to activate or not to activate the above-described additional functions via the setting screen.

However, even when the user sets the above-described functions to be activated or not to be activated, the login function and the complete deletion function are actually reflected to the operation of the image forming apparatus 1 after the image forming apparatus 1 is restarted. This is because the function for ensuring the security cannot realize the sufficient security unless the function is activated from start of the operation of the apparatus.

For example, when the complete deletion function is activated while the apparatus is being operated, the image data that has been recorded before the function is activated may be left recoverable. Of course, these functions are examples of setting items requiring restarting to reflect the setting, and the present invention does not limit the configuration only to the configuration described above.

Further, the image forming apparatus 1 has a function for displaying the screens described below on the display panel of the operation unit 5. Such screens are formed to be switched in response to a user's predetermined operation.

Normal Screen

The normal screen is normally displayed on the operation unit 5, and when this screen is being displayed, the image forming apparatus 1 receives instructions for performing various types of jobs described above via the operation button provided for the operation unit 5. Further, when the user's predetermined operation is received, the display is switched to a user mode screen described below.

Login Screen

The login screen is displayed when the login function described above is set to be activated. When this screen is being displayed, the image forming apparatus 1 receives an input of a user ID and a password via the operation button of the operation unit 5. When the user ID and the password input by the user are valid, the display of the operation unit 5 is switched to the normal screen.

User Mode Screen

The user mode screen is a setting screen in which general users can change the settings of the setting items except for the setting items specified for a service man. In the general image forming apparatus, a term of the "setting screen" is used for description, however, to clearly describe a difference from the service mode screen described above, a term of the "user mode screen" is used herein. The user mode screen can set the high-speed activation function and the login function to be activated or not to be activated.

Service Mode Screen

The service mode screen is the screen via which the service person can adjust the operation of the image forming apparatus 1 and change the setting of special setting items. The service mode screen can set the complete deletion function to be activated or not to be activated.

The user mode screen and the service mode screen are examples of a first screen. Further, the normal screen and the login screen are examples of a second screen.

<Operation of Apparatus>

Next, the operation performed by the apparatus according to the present exemplary embodiment will be described with reference to FIGS. 5 to 10. The operation illustrated in each flowchart can be realized when the CPU 201 executes the program loaded in the memory 203.

Figure 5:
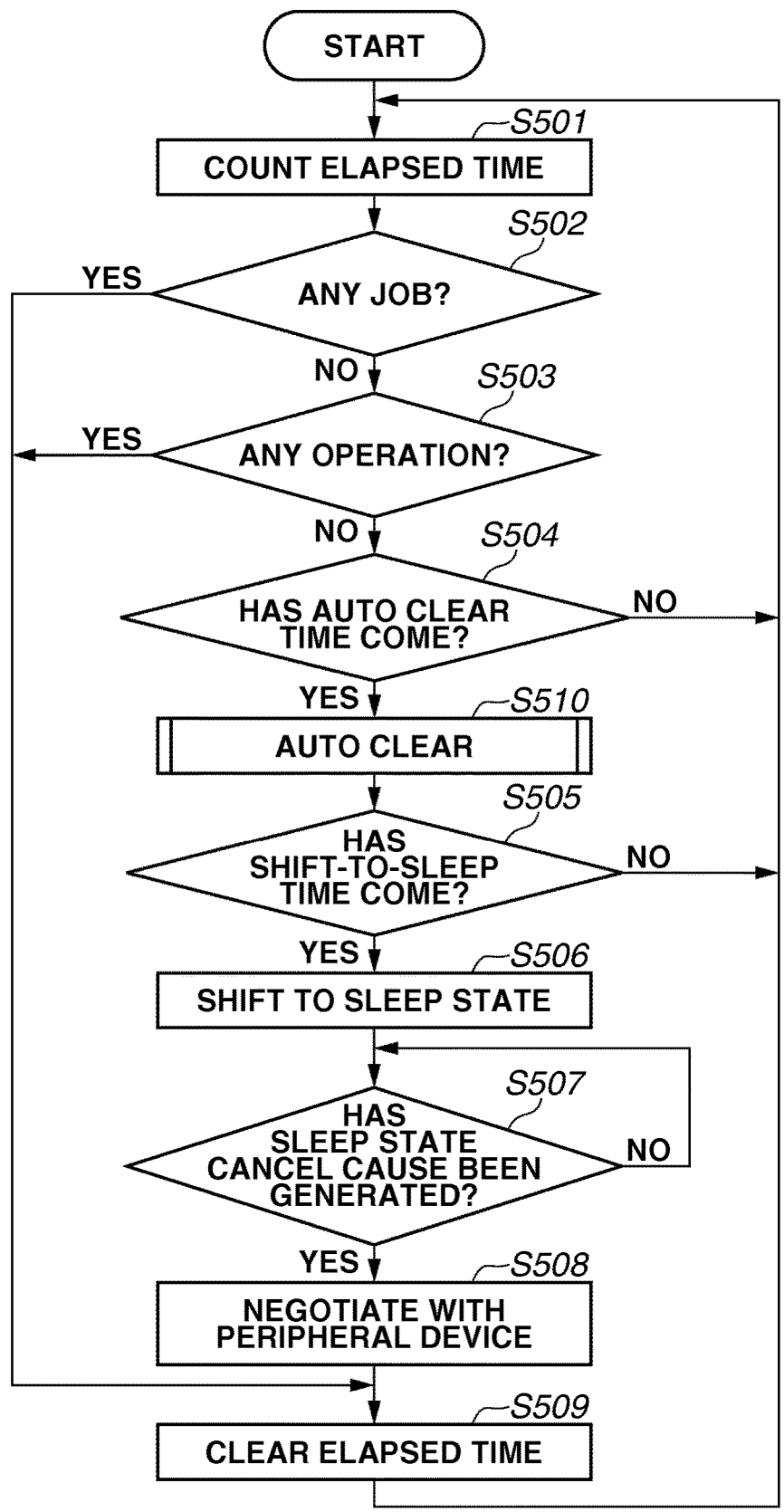
FIG. 5 is a flowchart illustrating an operation of the image forming apparatus in a power-on state according to an exemplary embodiment of the present invention.

FIG. 5 is a flowchart illustrating an operation of the image forming apparatus in the power-on state according to the present exemplary embodiment.

In step S501, the CPU 201 counts the elapsed time that has elapsed without any job and the user's operation performed. The elapsed time is retained in the memory 203. After the processing of step S501 is performed, the processing proceeds to step S502.

In step S502, the CPU 201 determines whether the image forming apparatus 1 has input the job. When the image forming apparatus 1 has input a job (YES in step S502), the processing proceeds to step S509. When the image forming apparatus 1 has not input a job (NO in step S502), the processing proceeds to step S503.

In step S503, the CPU 201 determines whether the user has performed an operation via the operation unit 5. When the user has performed an operation (YES in step S503), the processing proceeds to step S509. When the user has not performed an operation (NO in step S503), the processing proceeds to step S504.

In step S504, the CPU 201 determines whether the elapsed time being counted has become an auto-clear time that has been previously set. When the elapsed time has reached the auto-clear time (YES in step S504), the processing proceeds to step S510. When the elapsed time has not reached the auto-clear time (NO in step S504), the processing returns to step S501.

In step S505, the CPU 201 determines whether the elapsed time being counted has become the sleep shift time that has been previously set. When the elapsed time has reached the sleep shift time (YES in step S505), the processing proceeds to step S506. When the elapsed time has not reached the sleep shift time (NO in step S505), the processing returns to step S501.

In step S506, the CPU 201 shifts the image forming apparatus 1 to the sleep state illustrated in FIG. 4C. At this time, the CPU 201 notifies the power source monitor H/W 403 of the shift to the sleep state. Upon receiving the notification, the power source monitor H/W 403 controls the FET 313 via the power-source remote signal 306 to stop the power supply to the printer device 4 and the scanner device 2. After the processing in step S506 is performed, the processing proceeds to step S507.

In step S507, the CPU 201 determines whether a predetermined cause for canceling the sleep state has been generated. The cause for canceling the sleep state herein is, for example, that the data is input to the network I/F 210 or the FAX device 7, or asleep cancel switch of the operation unit 5 is pressed by the user. When the cause has been generated (YES in step S507), the processing proceeds to step S508. When the cause has not been generated (NO in step S507), the processing loops back from step S507 and waits.

In step S508, the CPU 201 performs negotiation with the printer device 4 and the scanner device 2 to establish communication. With the communication, the image forming apparatus 1 can perform various types of jobs. After the processing in step S508 is performed, the processing proceeds to step S509.

In step S509, the CPU 201 clears the elapsed time to return to "0". After the processing in step S509 is performed, the processing returns to step S501.

In step S510, the CPU 201 performs auto-clear processing. Details of the auto-clear processing will be described below with reference to FIG. 6. When the auto-clear processing has been already performed, it does not have to be performed again. After the processing in step S510 is performed, the processing proceeds to step S505.

Figure 6:
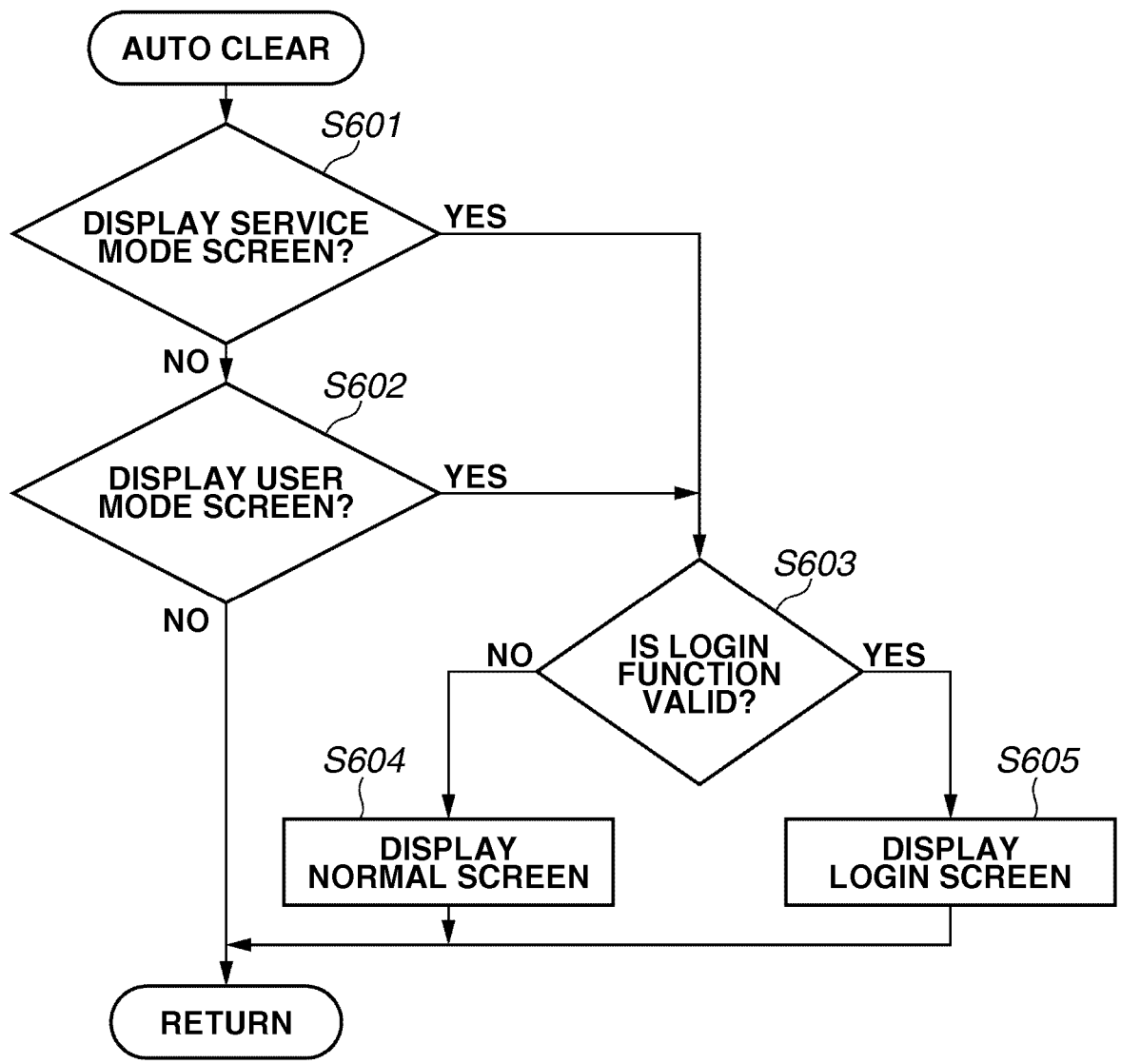
FIG. 6 is a flowchart illustrating auto-clear processing performed by the image forming apparatus according to an exemplary embodiment of the present invention.

FIG. 6 is a flowchart illustrating the auto-clear processing performed by the image forming apparatus according to the present exemplary embodiment.

By performing the auto-clear processing, the screen displayed by the operation unit 5 can be returned to the screen to be displayed as an initial state of the system.

In step S601, the CPU 201 determines whether the service mode screen is displayed on the operation unit 5. When the service mode screen is displayed (YES in step S601), the processing proceeds to step S603. When the service mode screen is not displayed (NO in step S601), the processing proceeds to step S602).

In step S602, the CPU 201 determines whether the user mode screen is displayed on the operation unit 5. When the user mode screen is displayed (YES in step S602), the processing proceeds to step S603. When the user mode screen is not displayed (NO in step S602), the processing returns to the main flowchart. When the user mode screen is not displayed, the current display screen, which is the normal screen, is basically retained as it is, however, when a screen other than a top screen is displayed in the normal screen, the top screen in the normal screen may be displayed.

In step S603, the CPU 201 determines whether the login function is previously set to be activated. Which screen is to be displayed on the operation unit 5 as an initial state is determined herein. When the login function is previously set to be activated (YES in step S603), the processing proceeds to step S605. When the login function is not previously set to be activated (NO in step S603), the processing proceeds to step S604.

In step S604, the CPU 201 clears the screen (service mode screen or user mode screen) that is currently displayed, and then displays the normal screen on the operation unit 5. The top screen of the normal screen is basically displayed, however, a screen that has been displayed right before the service mode screen or the user mode screen is displayed may be displayed. After the processing in step S604 is performed, the processing returns to the main flowchart.

In step S605, the CPU 201 clears the screen (service mode screen or user mode screen) currently displayed, and then displays the login screen on the operation unit 5. At this time, when there is a user currently logged in, the user may be made to be logged out. Further, at this time, the data internally retained for each user such as the user ID may be cleared together. After the processing in step S605 is performed, the processing returns to the main flowchart.

Figure 7:
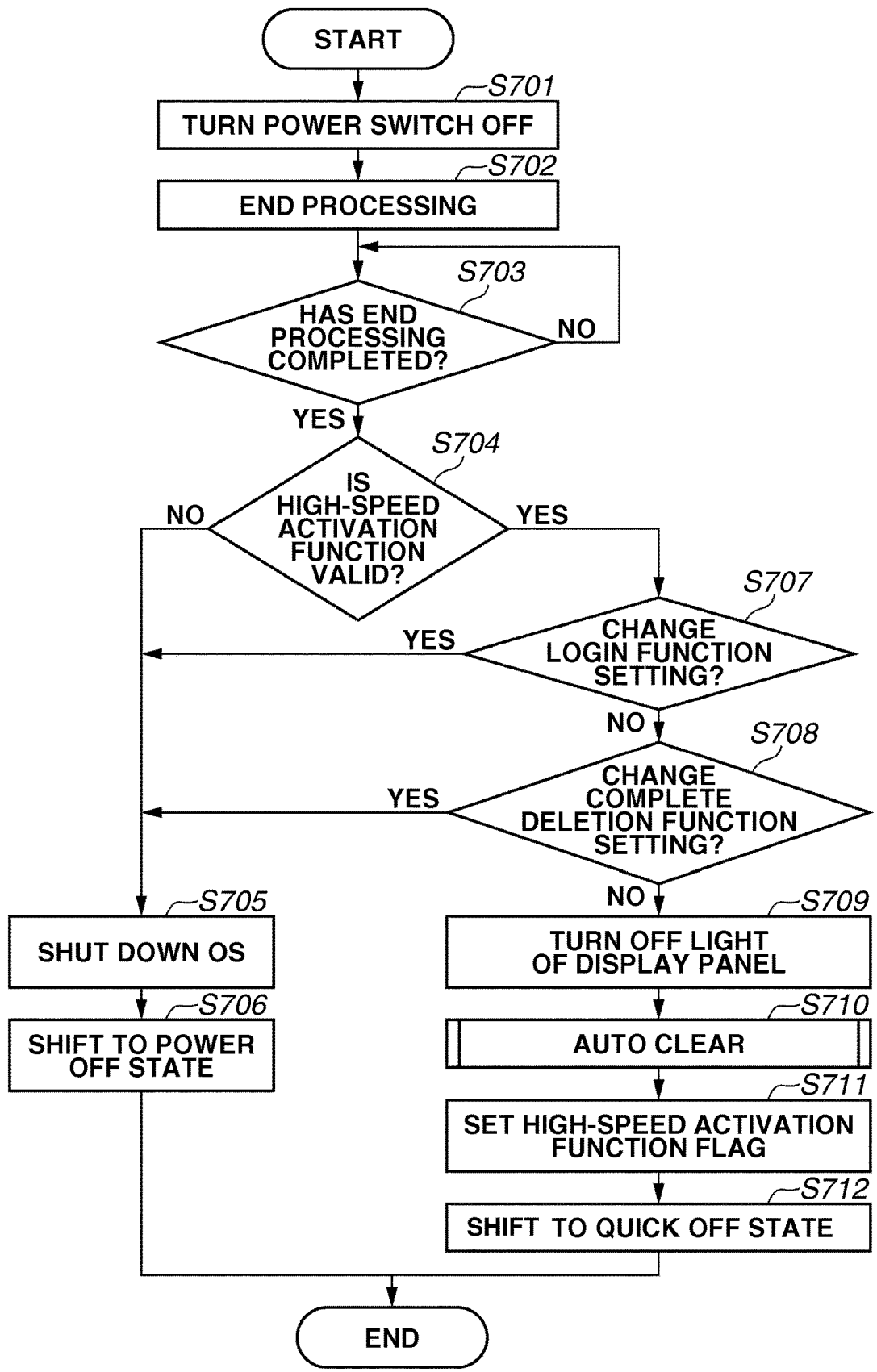
FIG. 7 is a flowchart illustrating an operation of the image forming apparatus when a power switch is turned off according to a first exemplary embodiment of the present invention.

FIG. 7 is a flowchart illustrating an operation of the image forming apparatus when a power switch is turned off according to a first exemplary embodiment of the present invention. This operation is started from the power-on state or the sleep state.

In step S701, the CPU 201 detects that the switch 302 is turned off. When the switch 302 is turned off, this detection is realized by the power source monitor H/W 403 transmitting interruption to the CPU 201. To turn off the switch 302 is an example of a first instruction. Further, to detect that the switch 302 has been turned off is an example of a first reception. After the processing in step S701 is performed, the processing proceeds to step S702.

In step S702, the CPU 201 performs ending processing on the service or the job that are currently being performed. At this time, the CPU 201 displays a message indicating that the processing is being shutting down on the screen of the operation unit 5.

In step S703, the CPU 201 determines whether the ending processing has been finished. When the ending processing has been finished (YES in step S703), the processing proceeds to step S704. When the ending processing has not been finished (NO in step S703), the processing loops back from step S703 and waits.

In step S704, the CPU 201 determines whether the high-speed activation function is set to be activated. When the high-speed activation function is set to be activated (YES in step S704), the processing proceeds to step S707. When the high-speed activation function is not set to be activated (NO in step S704), the processing proceeds to step S705.

In step S705, the CPU 201 invokes a shutdown I/F of an operating system (OS) and then performs OS software final ending processing In this processing, for example, the operation for writing back disk cash of the hard disk device 6 is performed. After the processing in step S705 is performed, the processing proceeds to step S706.

In step S706, the CPU 201 shifts the image forming apparatus 1 to the power-off state (described above with reference to FIG. 4B). The CPU 201 controls the power supply to each unit of the image forming apparatus 1. The power source monitor H/W 403 controls the FETs 313 to 316 via the power-source remote signal 306 to stop the power supply to the printer device 4, the scanner device 2, the FAX device 7, and the network I/F 210. After the processing in step S706 is performed, the processing ends. In step S706, after the image forming apparatus 1 is restarted, the image forming apparatus 1 may be shifted to the quick-off state (described above with reference to FIG. 4D).

In step S707, the CPU 201 determines whether the setting of the login function is changed. More specifically, the CPU 201 determines whether the setting of activating/non-activating the login function is changed via the user mode screen. To reflect the setting item, the image forming apparatus 1 needs to be restarted. When the login function is changed to be activated from being non-activated, the login screen needs to be displayed. On the other hand, when the login function is changed to be non-activated from being activated, the login screen does not need to be displayed. When the setting of the login function is changed (YES in step S707), the processing proceeds to step S705. When the setting of the login function is not changed (NO in step S707), the processing proceeds to step S708.

In step S708, the CPU 201 determines whether the setting of the complete deletion function is changed. More specifically, the CPU 201 determines whether the setting of activating/non-activating the complete deletion function is changed via the service mode screen. To reflect this setting item, the image forming apparatus 1 also needs to be restarted. When the setting of the complete deletion function is changed (YES in step S708), the processing proceeds to step S705. When the setting of the complete deletion function is not changed (NO in step S708), the processing proceeds to step S709.

In step S709, the CPU 201 turns off the display on the display panel of the operation unit 5. After the processing in step S709 is performed, the processing proceeds to step S710.

In step S710, the CPU 201 executes the auto-clear processing (described above with reference to FIG. 6). After the processing in step S710 is performed, the processing proceeds to step S711.

In step S711, the CPU 201 sets a high-speed activation function flag to a non-volatile register 402. Contents of the non-volatile register 402 is retained even when the controller 3 is not energized. After processing in step S711 is performed, the processing proceeds to step S712.

In step S712, the CPU 201 shifts the image forming apparatus 1 to the quick-off state (described above with reference to FIG. 4D). At this time, the CPU 221 saves its own program into the memory 203. To shift the image forming apparatus 1 to the quick-off state is an example of a first shift. The CPU 201 controls power supply to each unit of the image forming apparatus 1 via the power source monitor H/W 403. The power source monitor H/W 403 controls the FETs 313 to 316 via the power-source remote signal 306 to stop the power supply to the printer device 4, the scanner device 2, the FAX device 7, and the network I/F 210. After the processing in step S711 is performed, the processing ends.

Figure 8:
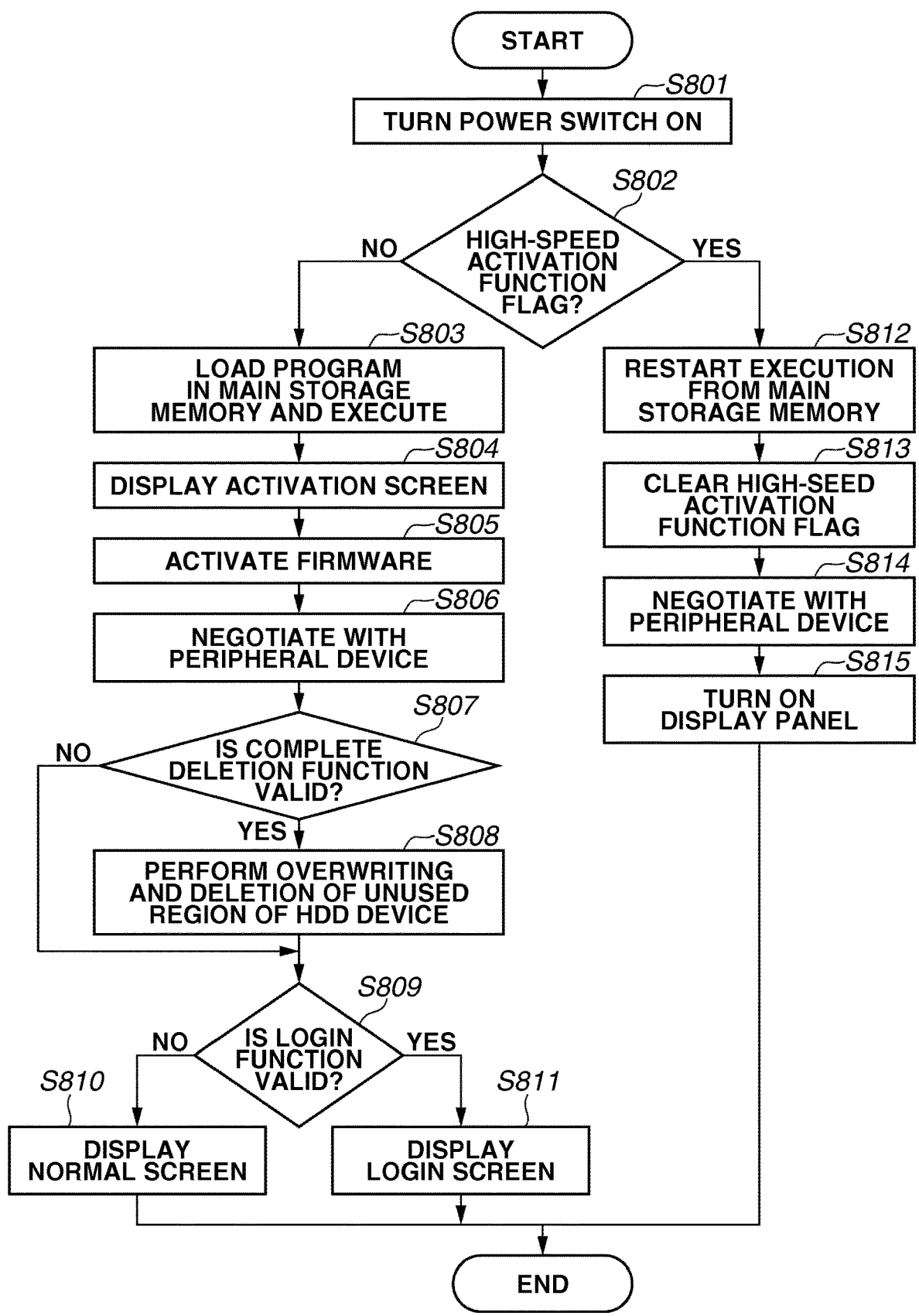
FIG. 8 is flowchart illustrating an operation of the image forming apparatus when the power switch is turned on according to the first exemplary embodiment of the present invention.

FIG. 8 is a flowchart illustrating the operation of the image forming apparatus when the power switch is turned on according to the first exemplary embodiment of the present invention.

This operation is started from the power-off state or the quick-off state.

In step S801, the CPU 201 detects that the switch 302 is turned on. When the switch 302 is turned on, this detection is realized by the power source monitor H/W 403 transmitting interruption to the CPU 201.

To turn on the switch 302 is an example of a second instruction. Further, to detect that the switch 302 has been turned on is an example of a second reception. At this time, the CPU 201 executes the initial program stored in the boot ROM 202.

Further, the power source unit 301 starts the power supply to each unit of the image forming apparatus 1 including the controller 3, the printer device 4, and the scanner device 2, and the power supply state becomes the power-on state illustrated in FIG. 4A. After the processing in step S801 is performed, the processing proceeds to step S802.

In step S802, the CPU 201 determines whether the high-speed activation function flag is set to the non-volatile register 402. When the high-speed activation function flag is set to the non-volatile register 402 (YES in step S802), the processing proceeds to step S812. When the high-speed activation function flag is not set to the non-volatile register 402 (NO in step S802), the processing proceeds to step S803.

In step S803, the CPU 201 loads the executable programs such as the OS and the firmware from the flash disk 207 into the memory 203. In other words, in step S803, the CPU 201 shifts the image forming apparatus 1 to the power-on state (described above with reference to FIG. 4A).

When loading is finished, the CPU 201 starts to execute the program in the memory 203 in place of the initial program stored in the boot ROM 202. At this time, the CPU 221 loads the executable programs such as the OS and the firmware from the flash disk 207 into the memory 223, and then executes it. After the processing in step S803 is performed, the processing proceeds to step S804.

In step S804, the CPU 201 turns on the display panel of the operation unit 5 to display a message indicating that the image forming apparatus 1 is in activation. After the processing in step S804 is performed, the processing proceeds to step S805.

In step S805, the CPU 201 executes activation processing of the firmware. The initialization processing includes the initialization processing of the firmware required for setting the controller 3 to a state where the job can be performed. Further, the activation processing includes processing for reading the setting values from the non-volatile memory 205 and reflecting them for various types of the setting items whose settings can be changed by the user. Furthermore, the activation processing includes processing for activating the sub board 220. After the processing in step S805 is performed, the processing proceeds to step S806.

In step S806, the CPU 201 performs negotiation with the printer device 4 and the scanner device 2 to establish the communication. After the processing in step S806 is performed, the processing proceeds to step S807.

In step S807, the CPU 201 determines whether the complete deletion function is activated. More specifically, the CPU 201 determines whether the activation has been performed for the first time since the complete deletion function has been changed to be activated. When the complete deletion function is activated (YES in step S807), the processing proceeds to step S808. When the complete deletion function is not activated (NO in step S807), the processing proceeds to step S809.

In step S808, the CPU 201 performs the overwriting with the random data in unused regions of the hard disk device 6. When the image forming apparatus 1 has performed the job with the setting in which the complete deletion function has not been activated, the image that has been recorded in the hard disk device 6 by the job that has been performed in the past is not deleted by the method for making the image to be hardly recovered.

The region where such images are recorded is treated just as the unused region in the hard disk device 6. To ensure the security, by performing the overwriting with the random data in the unused region, the image is made to be hardly recovered. Since it is difficult to perform this processing simultaneously with performing the job, the processing is performed while the processing is being activated when the job is not received. After the processing in step S808 is performed, the processing proceeds to step S809.

In step S809, the CPU 201 determines whether the login function is set to be activated. When the login function is set to be activated (YES in step S809), the processing proceeds to step S811. When the login function is not set to be activated (NO in step S809), the processing proceeds to step S810.

In step S810, the CPU 201 displays the normal screen on the operation unit 5. After the processing in step S810 is performed, the processing ends.

In step S811, the CPU 201 displays the login screen on the operation unit 5. After the processing in step S811 is performed, the processing ends.

In step S812, the CPU 201 restarts executing the program in the memory 203. In other words, in step S812, the CPU 201 shifts the image forming apparatus 1 to the power-on state (described above with reference to FIG. 4A). To shift the image forming apparatus 1 to the power-on state is an example of a second shift.

In this case, the image forming apparatus is shifted to the quick-off state by the operation performed when the processing is being shut down as described above, and thus it is shifted after the content of the memory 203 has been retained. At this point the CPU 221 loads its own program saved in the memory 203 into the memory 223 and executes it. After the processing in step S812 is performed, the processing proceeds to step S813.

In step S813, the CPU 201 clears the high-speed function flag from the non-volatile register 402. After the processing in step S813 is performed, the processing proceeds to step S814.

In step S814, the CPU 201 performs negotiation with the printer device 4 and the scanner device 2 to establish the communication. After the processing in step S814 is performed, the processing proceeds to step S815.

In step S815, the CPU 201 turns on the display panel of the operation unit 5. As a result, the screen (normal screen or login screen) in the display state, which is a result of auto clear performed by the above-described shutdown processing, is displayed on the operation unit 5. With the display, the image forming apparatus 1 can be operated by the user. After the processing in step S815 is performed, the processing ends.

The image forming apparatus 1 according to the present exemplary embodiment is configured to retain the content of the main storage memory by energizing the main storage memory even when the power switch is off. However, this configuration is only an example. The content of the main storage memory may be stored in the non-volatile storage device, and the power may be turned off. When the power is turned on next time, a hibernation technique for recovering the stored content stored in the main storage memory may be restored using any hardware/software means.

The present exemplary embodiment can be applied to the image forming apparatus in which the content of the main storage memory is retained when the power switch is turned off and then the content is used when the power switch is turned on next time.

As described above, according to the image forming apparatus described in the present exemplary embodiment, the problem of the screen display can be solved that arises in the image forming apparatus using the high-speed activation method for retaining the content of the main storage memory when the power switch is turned off. In other words, even when the setting screen is displayed when the user turns off the power switch, the setting screen is not displayed next time the power switch is turned on, while the waiting time for the activation is reduced.

In addition, if the setting item is changed that requires to reset the image forming apparatus to reflect the change of the setting when the power switch is turned off, the program is shut down without using the high-speed activation method to reflect the change when the power switch is turned on next time. This arrangement can improve convenience of the apparatus.

According to the first exemplary embodiment, the auto-clear processing is performed when the power switch is turned off.

According to a second exemplary embodiment, the auto-clear processing is performed when the power switch is turned on. With such a configuration, compared with the first exemplary embodiment, although the time required for the activation takes longer, the time required for the shutdown can be reduced.

Since the configurations of the second exemplary embodiment are similar to those in FIGS. 1 to 6 in the first exemplary embodiment, the description will not be repeated. Further, in FIGS. 9 and 10, the same steps as those in the first exemplary embodiment will have the same numbers and the description thereof will not be repeated.

Figure 9:
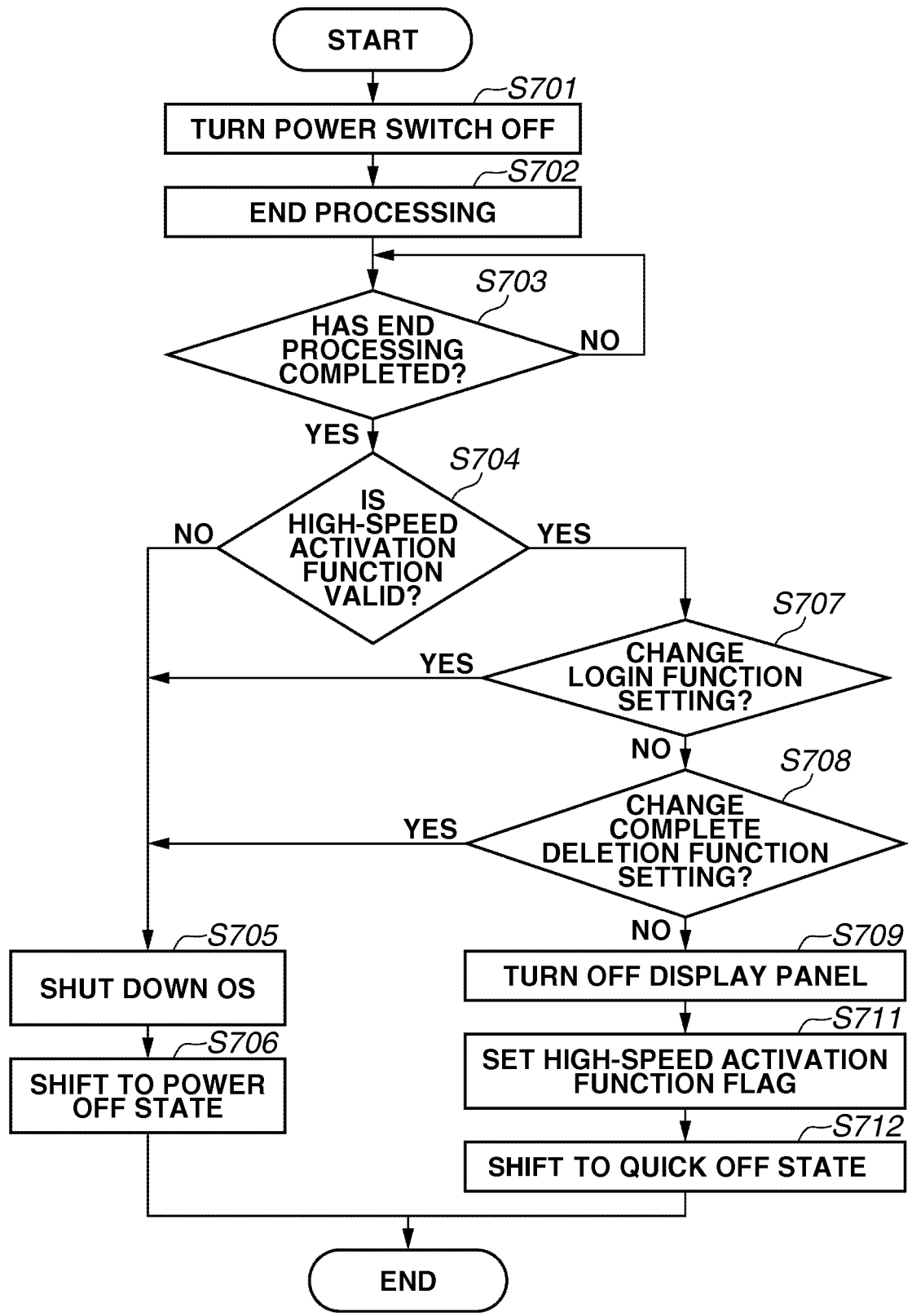
FIG. 9 is a flowchart illustrating an operation of the image forming apparatus when the power switch is turned off according to a second exemplary embodiment of the present invention.

FIG. 9 is a flowchart illustrating an operation when the power switch is turned off in the image forming apparatus according to the second exemplary embodiment of the present invention.

Compared with FIG. 7, step S710 (auto-clear processing) is not performed in FIG. 9, which is characteristic therein.

Figure 10:
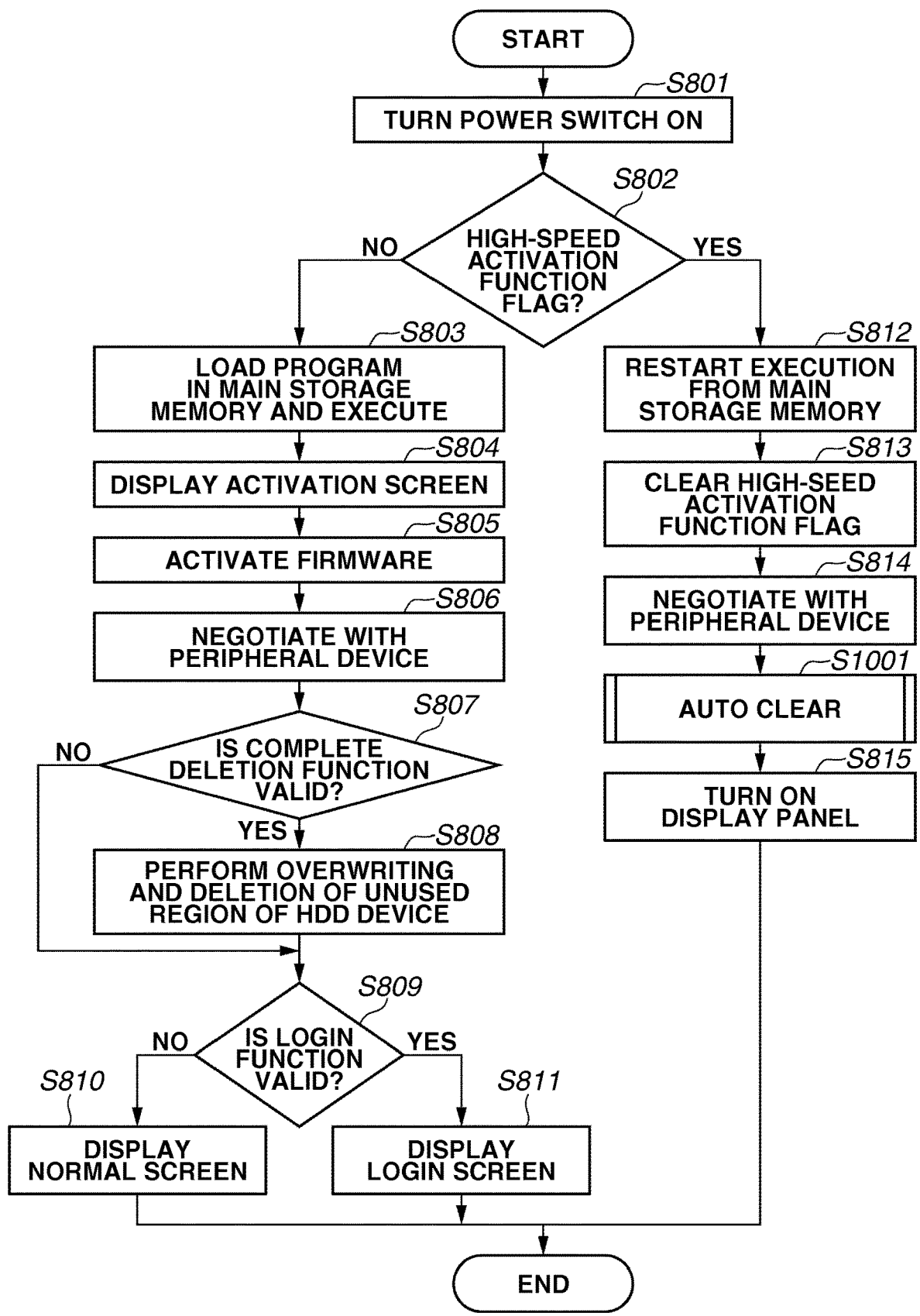
FIG. 10 is a flowchart illustrating an operation of the image forming apparatus when the power switch is turned on according to the second exemplary embodiment of the present invention.

FIG. 10 is a flowchart illustrating an operation of the image forming apparatus when the power switch is turned on according to the second exemplary embodiment of the present invention.

Compared with FIG. 8, step S1001 (auto-clear processing) is added between steps S814 and S815 in FIG. 10, which is characteristic therein.

As described above, according to the image forming apparatus described in the present exemplary embodiment, even when the power switch is turned off with the setting screen displayed in the image forming apparatus using the high-speed method, when the power switch is turned on next time, the setting screen is not displayed.

Further, by performing the auto-clear processing after the power switch is turned on, the time required for the shutdown until the state is shifted to the quick-off state can be reduced.

Which control of the first exemplary embodiment and the second exemplary embodiment is to be employed can be previously set by the user via the operation unit 5.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus comprising:
  a display;
  one or more controllers, each including a processor, a first memory configured to store program data to be executed by the processor, and a second memory configured to hold working data loaded from the program data; and
  a power source unit capable of operating in a plurality of power supply states, the plurality of power supply states including (A) a power-saving state in which the power to the processor is stopped and the power is supplied to the second memory, and (B) a power-on state in which the power is supplied to the processor and the second memory,
  wherein the one or more controllers are configured to function as:
  a first unit configured to cause the second memory to hold the working data including information about a screen to be currently displayed, and cause the display to display the screen based on the information about the screen held by the second memory; and
  a second unit configured to update the information about the screen to be currently displayed to information about a predetermined screen in the second memory before the power supply state of the power source unit is shifted to the power-saving state so that a screen to be displayed immediately after the power supply state returns to the power-on state next time is the predetermined screen, in response to reception of an instruction to shift the power supply state of the power source unit from the power-on state to the power-saving state.

2. The image processing apparatus according to claim 1, wherein the one or more controllers cause the display to display a booting screen and then cause the display to display the predetermined screen when the power supply state is shifted from a power-off state to the power-on state.

3. The image processing apparatus according to claim 1, wherein the predetermined screen is a login screen for inputting information required to authenticate a user.

4. The image processing apparatus according to claim 3, wherein the required information is a user identification (ID).

5. The image processing apparatus according to claim 1, wherein the power-on state is shifted to the power-saving state or a power-off state according to a preset value when a power switch is operated by the user.

6. The image processing apparatus according to claim 1, wherein the power-saving state is a suspend state.

7. The image processing apparatus according to claim 1, wherein the power-on state is shifted to the power-saving state in a case where a predetermined activation function is activated when a power switch is operated by the user, and the power-on state is shifted to a power-off state in a case where the predetermined activation function is deactivated when the power switch is operated by the user.

8. The image processing apparatus according to claim 7, wherein the one or more controllers execute an activation program stored in a boot ROM and the one or more controllers activate the image processing apparatus in the case where the predetermined activation function is deactivated, and the one or more controllers shift the power supply state back from the power-saving state to the power-on state without executing the activation program stored in the boot ROM in a case where the predetermined activation function is activated.

9. The image processing apparatus according to claim 1, further comprising a printing unit configured to print an image on a sheet.

10. An image processing apparatus comprising:
  a display;
  one or more controllers, each including a processor, a first memory configured to store program data to be executed by the processor, and a second memory configured to hold working data loaded from the program data; and
  a power source unit capable of operating in a plurality of power supply states, the plurality of power supply states includes (A) a power-saving state for a suspend function in which the power to the processor is stopped and the power is supplied to the second memory, and (B) a power-on state in which the power is supplied to the processor and the second memory,
  wherein the one or more controllers are configured to function as:
  a first unit configured to cause the second memory to hold the working data including information about a screen to be currently displayed and cause the display to display the screen based on the information about the screen held by the second memory; and
  a second unit configured to shift the power supply state of the power source unit to the power-saving state in response to reception of an instruction to shift the power supply state of the power source unit from the power-on state to the power-saving state, and subsequently, to update the information about the screen to be currently displayed to information about a predetermined screen in the second memory and then turn on the display in response to return to the power-on state.

11. The image processing apparatus according to claim 10, wherein the one or more controllers cause the display to display a booting screen and then cause the display to display the predetermined screen when the power supply state is shifted from a power-off state to the power-on state.

12. The image processing apparatus according to claim 10, wherein the predetermined screen is a login screen for inputting information required to authenticate a user.

13. The image processing apparatus according to claim 12, wherein the required information is a user identification (ID).

14. The image processing apparatus according to claim 10, wherein the power-on state is shifted to the power-saving state or a power-off state according to a preset value when a power switch is operated by the user.

15. The image processing apparatus according to claim 10, wherein the power-saving state is a suspend state.

16. The image processing apparatus according to claim 10,
wherein the power-on state is shifted to the power-saving state in a case where a predetermined activation function is activated when a power switch is operated by the user, and the power-on state is shifted to a power-off state in a case where the predetermined activation function is deactivated when the power switch is operated by the user.

17. The image processing apparatus according to claim 16, wherein the one or more controllers execute an activation program stored in a boot ROM and the one or more controllers activate the image processing apparatus in the case where the predetermined activation function is deactivated, and the one or more controllers shift the power supply state back from the power-saving state to the power-on state without executing the activation program stored in the boot ROM in a case where the predetermined activation function is activated.

18. The image processing apparatus according to claim 10, further comprising a printing unit configured to print an image on a sheet.

* * * * *